(12) United States Patent
Albers et al.

(10) Patent No.: US 9,778,888 B2
(45) Date of Patent: Oct. 3, 2017

(54) CUSTOMIZABLE MEDIA-BASED SCHEDULING FOR A PRINTING SYSTEM

(71) Applicants: Walter R. Albers, Broomfield, CO (US); Joseph P. Gaertner, Lafayette, CO (US); Marquis G. Waller, Beverly, OH (US)

(72) Inventors: Walter R. Albers, Broomfield, CO (US); Joseph P. Gaertner, Lafayette, CO (US); Marquis G. Waller, Beverly, OH (US)

(73) Assignee: RICOH COMPANY, LTD., Tokyo (JP)

( * ) Notice: Subject to any disclaimer, the term of this patent is extended or adjusted under 35 U.S.C. 154(b) by 311 days.

(21) Appl. No.: 14/189,086

(22) Filed: Feb. 25, 2014

(65) Prior Publication Data

US 2015/0242162 A1 Aug. 27, 2015

(51) Int. Cl.
*G06F 15/00* (2006.01)
*G06F 3/12* (2006.01)

(52) U.S. Cl.
CPC ............ *G06F 3/126* (2013.01); *G06F 3/1205* (2013.01); *G06F 3/1288* (2013.01); *G06F 3/1226* (2013.01)

(58) Field of Classification Search
None
See application file for complete search history.

(56) References Cited

U.S. PATENT DOCUMENTS

| 2004/0047643 A1* | 3/2004 | Jackelen et al. ............. 399/81 |
| 2008/0158624 A1 | 7/2008 | Hayashi |
| 2011/0267640 A1 | 11/2011 | Takahashi |
| 2012/0060157 A1* | 3/2012 | Sekine et al. ............ 718/100 |
| 2012/0236333 A1* | 9/2012 | Kiuchi et al. ............. 358/1.9 |
| 2012/0250074 A1* | 10/2012 | Kamppari et al. ......... 358/1.15 |
| 2013/0136462 A1* | 5/2013 | Iida ............................ 399/23 |
| 2013/0163014 A1* | 6/2013 | Xiao .......................... 358/1.13 |

FOREIGN PATENT DOCUMENTS

| JP | 2001199577 A | 7/2001 |
| JP | 2005008360 A | 1/2005 |

OTHER PUBLICATIONS

Help-Ricoh production print solutions information center. Copyright 2006.
Sidles, C. Graphic designer's digital printing and prepress handbook.

* cited by examiner

*Primary Examiner* — Helen Q Zong
(74) *Attorney, Agent, or Firm* — Duft Bornsen & Fettig LLP

(57) ABSTRACT

System and methods are provided for customizable media-based scheduling for a printing system. One embodiment is an apparatus that includes a print server. The print server is configured to receive a description of media in a printer, and to store a mapping that associates the description of media with at least one alternate description for the printer that is comparable to the description of media. The print server is also configured to receive a print job that specifies a media property that does not match the description of media in the printer. The print server is further configured to determine that the media property corresponds with the at least one alternate description for the printer based on the mapping, and to determine that the printer is eligible for scheduling the print job based on the determination that the media property corresponds with the at least one alternate description.

18 Claims, 4 Drawing Sheets

CUSTOMIZABLE MEDIA-BASED SCHEDULING FOR A PRINTING SYSTEM

FIELD OF THE INVENTION

The invention relates to the field of printing systems, and in particular, to implementing customizable media-based scheduling for a printing system.

BACKGROUND

A print shop typically includes a number of high-volume printers capable of printing incoming print jobs quickly and at high quality. The print shop may be managed by a print server that is operable to receive print jobs from a plurality of clients and schedule the print jobs with one of the printers under its control. Oftentimes, an operator is present to oversee print server software, manually fix printer issues, and reload the printers with media.

After receiving a print job, the print server manages workflow and schedules the print job based on user-selected options and the print capabilities of an available printer. Sometimes, a printer has its own print capabilities and/or print protocols that differ from other printers in the print shop architecture. As such, it is possible for two printers to have the same type of media loaded but identify and report the media differently to the print server. For example, a first printer may report media loaded therein as "Bright Yellow" while a second printer reports the same media as "Regular Yellow."

In current print server architecture, the media that is reported from the printers must directly match the media that is requested in a print job. When a match does not exist, the print server is unable to consider a printer that has reported non-matching media for scheduling the print job. As a result, the scheduling efficiency of the print server is detrimentally impacted because scheduling options are limited to only those printers with a direct media match even when a different printer or media type may have been suitable for that print job. Moreover, without a direct media match, the print job may be cancelled or suspended until the user or print operator makes a manual change to the print job or media loaded in a printer.

SUMMARY

Embodiments described herein provide for customizable media-based scheduling in a print shop architecture. One or more printers may be flexibly associated with alternate media descriptions to customize the scheduling of print jobs in a print server. The association allows the print server to schedule a print job with a printer that contains media that does not directly match with the media requested in the print job. As such, the print server may be afforded some leeway in scheduling decisions for a print job without departing meaningfully from the print job specifications provided by a client. For example, a print job that requests "Bright Yellow" media may be scheduled with a printer that contains "Regular Yellow" media in response to a determination that such non-matching media is suitable. As another example, when two printers in the print shop report the same type of media differently, associating one of the printers with an alternate media description may allow the print server to consider both printers for scheduling a print job, thereby increasing scheduling options and improving the efficiency of the print shop.

One embodiment is an apparatus. The apparatus includes a print server configured to receive a description of media in a printer, and to store a mapping that associates the description of media with at least one alternate description for the printer that is comparable to the description of media. The print server is also configured to receive a print job that specifies a media property that does not match the description of media in the printer. The print server is further configured to determine that the media property corresponds with the at least one alternate description for the printer based on the mapping, and to determine that the printer is eligible for scheduling the print job based on the determination that the media property corresponds with the at least one alternate description.

Another embodiment is a method. The method includes receiving, at a print server, a description of media in a printer, and storing a mapping that associates the description of media with at least one alternate description for the printer that is comparable to the description of media. The method also includes receiving a print job that specifies a media property that does not match the description of media in the printer. The method further includes determining that the media property corresponds with the at least one alternate description for the printer based on the mapping. The method also includes determining that the printer is eligible for scheduling the print job based on the determination that the media property corresponds with the at least one alternate description.

Yet another embodiment is a non-transitory computer readable medium embodying programmed instructions which, when executed by a processor, are configured for performing a method. The method includes receiving, at a print server, a description of media in a printer, and storing a mapping that associates the description of media with at least one alternate description for the printer that is comparable to the description of media. The method also includes receiving a print job that specifies a media property that does not match the description of media in the printer. The method further includes determining that the media property corresponds with the at least one alternate description for the printer based on the mapping. The method also includes determining that the printer is eligible for scheduling the print job based on the determination that the media property corresponds with the at least one alternate description.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
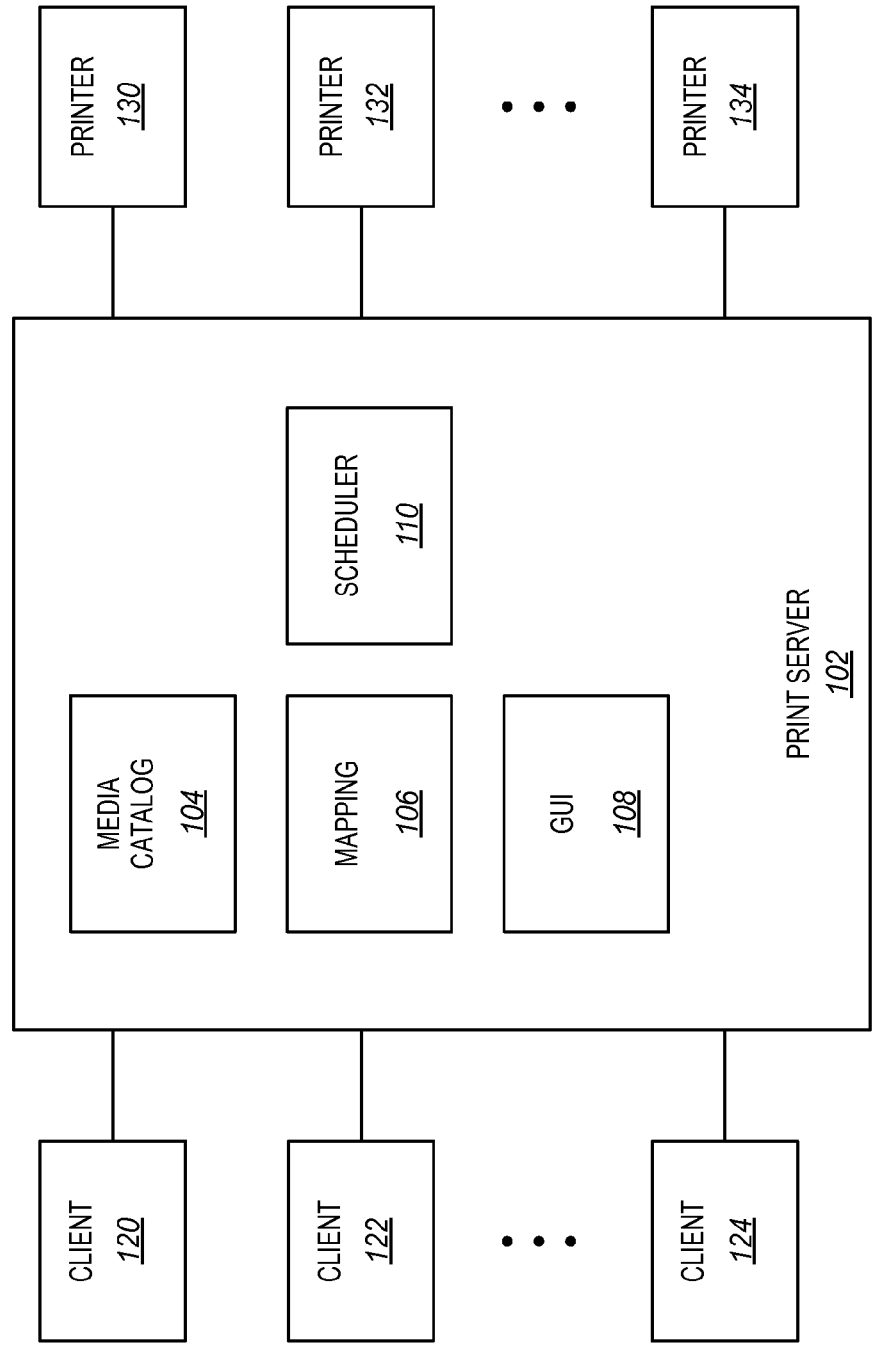
FIG. 1 is a block diagram of a print shop architecture in an exemplary embodiment.

FIG. 1 is a block diagram illustrating a print shop architecture 100 in an exemplary embodiment. Included in the print shop architecture 100 is a print server 102. The print server 102 is any system, component, or device that is configured to receive print jobs from the clients 120-124 and to schedule the print jobs with the printers 130-134. As such, the print server 102 may be implemented with a scheduler 110 that processes print jobs received from the clients 120-124 and directs the print jobs to one of the printers 130-134 based on information in a media catalog 104. The printers 130-134 generally include systems for transforming print data of the print jobs onto a suitable printable medium, such as paper, and generally are large production printing systems for high volume printing. The clients 120-124 may include banks, credit card companies, or other entities with printing needs (e.g., monthly bank statements, monthly credit card bills, etc.).

In previous printing systems, a print server is not able to schedule/send a print job to a printer unless there is a direct match between the description of media that is requested in the print job and the description of media that is loaded/reported in that printer. Thus, when a print server cannot find a match for any of the printers in the print shop architecture, the print job is cancelled or suspended until a user, such as a system operator, manually changes either the print job or the media loaded in the printer. Furthermore, in situations where two printers in a print shop report the same type of media differently, the print server is not able to determine that both printers may be suitable for a print job and may therefore schedule print jobs inefficiently.

The print server 102 of the print shop architecture 100 is thus configured with a mapping 106 that enables the scheduler 110 to schedule a print job with a printer even when the media reported by that printer (e.g., created/stored in media catalog 104) does not match the media requested in the print job. The mapping 106 may be configured/submitted via a graphical user interface such as GUI 108. With the mapping 106 stored on the print server 102, the scheduler 110 is able to, for subsequently received print jobs, adjust to a difference between a type of media requested in a print job and a type of media in the printers 130-134 and schedule/send the print job without any temporary suspension of the print job to correct for the difference.

Although shown and described with respect to a particular number of clients, printers, and print servers, the embodiments herein are not limited as such. The print shop architecture 100 may include additional components or systems not shown for the sake of brevity. Additional details of the function of the print server 102 will be apparent in FIG. 2 and the examples that follow.

Figure 2:
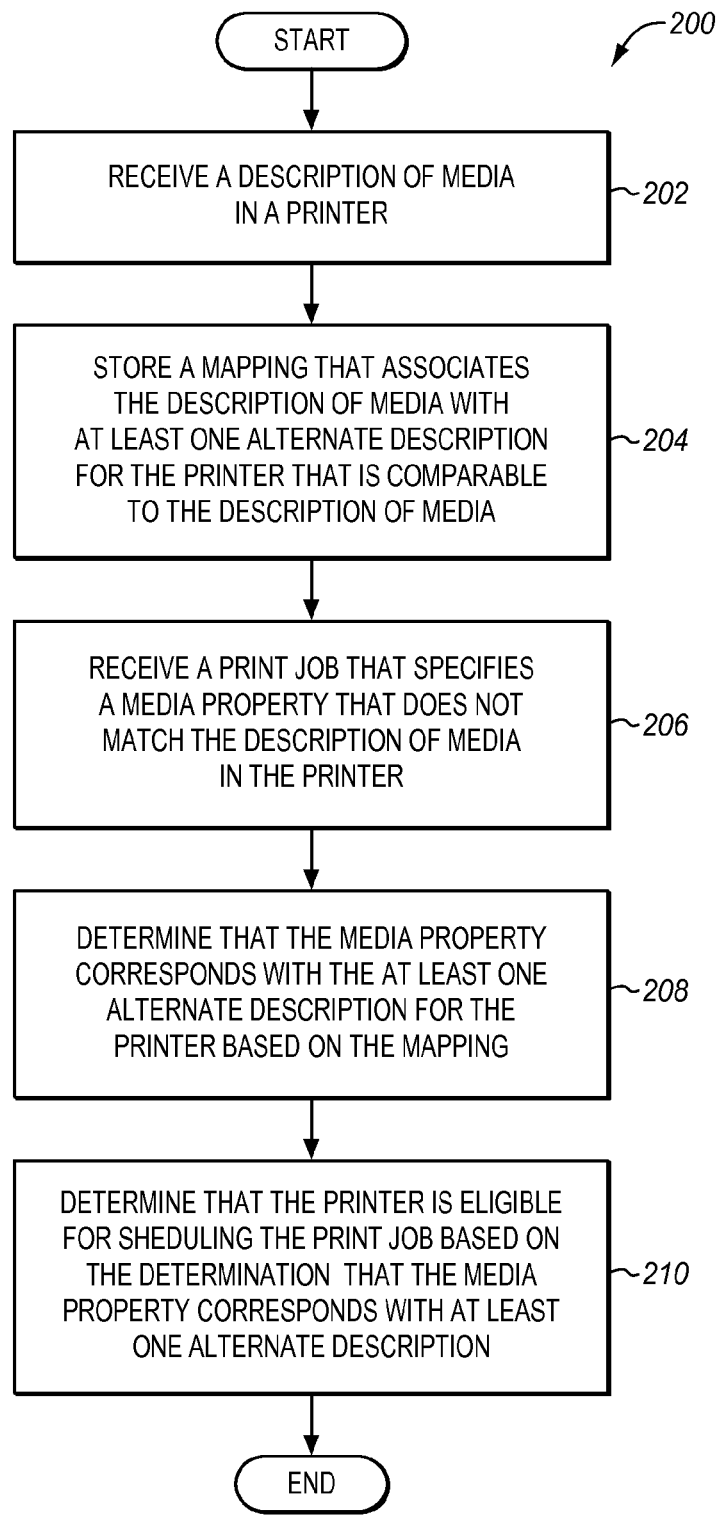
FIG. 2 is a flowchart illustrating a method for customizing media-based scheduling in a print shop architecture in an exemplary embodiment.

FIG. 2 is a flow chart illustrating a method 200 for customizing media-based scheduling in a print shop architecture in an exemplary embodiment. The steps of the method 200 will be described with respect to the print shop architecture 100 of FIG. 1, although one skilled in the art will understand that method 200 may be performed by other systems not shown. Assume, for the sake of this embodiment, that the print server 102 interfaces between one or more clients 120-124 and one or more printers 130-134. The steps of the method 200 described herein are not all inclusive and may include other steps not shown. The steps for the flow charts shown herein may also be performed in an alternative order.

At step 202, the print server 102 receives a description of media in one or more printer(s) 130-134. The description of media may include a name of the type of media contained in one or more physical trays of the printer. Additionally or alternatively, the description of media may include other properties of the media loaded in the printer such as size, color, weight, etc. Each description of media may be stored in a media catalog 104 that tracks the type of media available in each of the printers 130-134.

In one embodiment, the printers 130-134 each report one or more descriptions of media using a communication protocol, such as Simple Network Management Protocol (SNMP). Other bidirectional protocols may be used to report media descriptions to the print server 102, such as Job Definition Format or Job Messaging Format (JDF/JMF) resource queries that determine and report attributes of media installed in the printers 130-134. In another embodiment, the printers 130-134 report descriptions of media via a device capabilities (DevCaps) file associated therewith. A description of media may be automatically reported by the printers 130-134 when new media is loaded. Alternative or additionally, a description of media may be received in response to a user query, a polling interval of the print server 102, or manually created on the print server 102.

At step 204, the print server 102 stores a mapping 106 that associates the description of media with at least one alternate description for the printer that is comparable to the description of media. An alternate description for the printer may be different than the media description received from the printer at step 202 by at least one property (e.g., media name, color, size, and/or weight, etc.). In one embodiment, the mapping 106 is configured by a user via a graphical user interface, such as GUI 108. Alternatively or additionally, the print server 102 may be configured to create a mapping 106 for a printer by determining one or more alternate descriptions based on proximate values or ranges to the media description reported by that printer (e.g., similarity in name, weight, color, size, etc.).

At step 206, the print server 102 receives a print job from one of the clients 120-124 that specifies a media property that does not match the description of media in the printer (e.g., media description(s) received for that printer at step 202). A media property specified in a print job may include a name of the media and/or other properties of the media such as size, color, weight, etc. In some embodiments, a job ticket is associated with a print job which includes at least one specified media property for the print job. A job ticket may also include page exceptions for a print job that describe media and/or finishing instructions for certain pages in the print job that differ from the instructions for the print job. Thus, in some embodiments, the print server 102 determines specified media properties by examining a job ticket and page exceptions associated with a print job.

Print jobs may be received in a number of formats, such as Portable Document Format (PDF), Mixed Object: Document Content Architecture (MO:DCA), PostScript, etc. Job tickets may also be received in a variety of formats, including but not limited to, Job Definition Format (JDF), Print Production Format (PPF), Portable Job Ticket Format (PJTF), etc.

At step 208, the scheduler 110 determines that the media property specified in the print job corresponds with at least one alternate description for the printer based on the mapping 106. For example, the scheduler 110 may search a list of alternate descriptions in the mapping 106 to find a match between an alternate description and the media property specified in the print job.

At step 210, the scheduler 110 determines that the printer is eligible for scheduling the print job based on the determination that the media property specified in the print job corresponds with at least one alternate description for the printer. Thus, when the printer is associated with an alternate media description that corresponds with the media property specified in the print job, the scheduler 110 is able to schedule and send the print job to that printer despite a mismatch between the media property requested in the print job and a description of media in the printer.

The print server 102 may determine multiple printers eligible for the print job. For example, one or more of the printers 130-134 may be determined eligible based on the mapping 106 (e.g., described in the method 200 above). Additionally, one or more of the printers 130-134 may be determined eligible based on a direct media match between the media property specified in a print job and the description(s) of media in those printers. With eligible printers determined, the scheduler 110 may select a printer from the eligible printers for printing the print job based on several factors, including but not limited to, printer availability, size of print job, amount of available media, etc. Therefore, a printer deemed eligible for the print job may not necessarily be selected for reception of the print job. Additional details of the behavior of the print server 102 are provided in the examples below.

Examples

Figure 3:
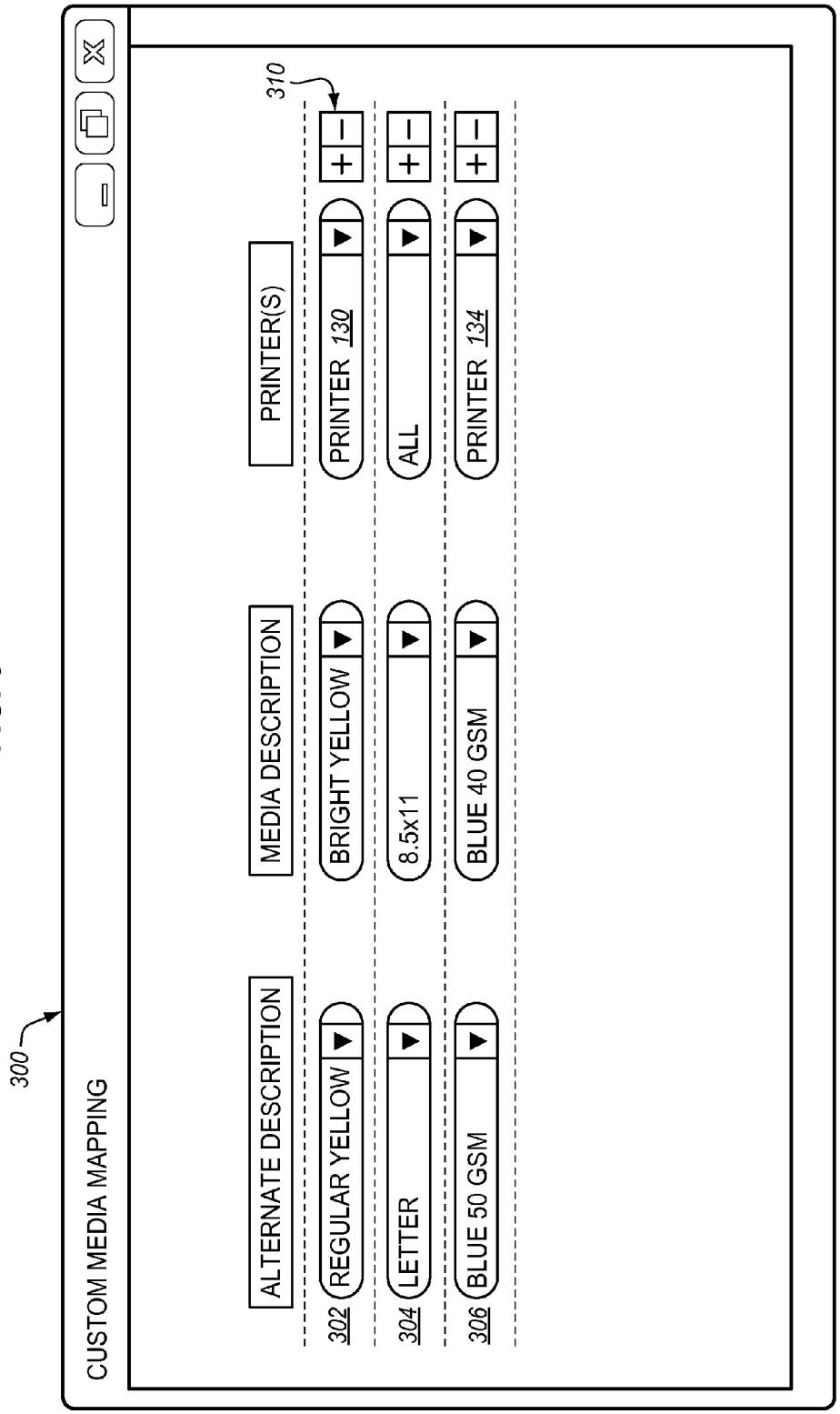
FIG. 3 is a block diagram of a Graphical User Interface (GUI) for custom media mapping in an exemplary embodiment.

Consider in the following example that a print operator wishes to configure customized media-based scheduling within a print shop architecture 100. To do so, the print operator may use a graphical user interface (e.g., GUI 108) communicatively coupled to the print server 102. FIG. 3 is a block diagram of a GUI 300 for custom media mapping in an exemplary embodiment. GUI 300 includes user-configurable fields 302-306 for implementing a mapping of alternate media descriptions for one or more of the printers 130-134. The print operator may create and/or select any number of mappings using a mouse, keyboard, etc. The print operator may add/activate or remove/deactivate mappings using a selectable button, such as that shown in element 310.

Suppose, in a first example, that a print operator loads the same type of yellow paper in two different printers, printer 130 and printer 132. However, despite the media being the same type in both printers, printer 130 reports the new media loaded in its tray as "Bright Yellow" while printer 132 reports the new media loaded in its tray as "Regular Yellow." The difference in reporting may be due to printer weight range settings, color settings, manufacturer, model, etc. In any case, the print server 102 creates/stores a ready media object in the media catalog 104 indicating a media name of "Bright Yellow" for printer 130. Similarly a ready media object indicating a media name of "Regular Yellow" for printer 132 is stored in the media catalog 104.

When one of the clients 120-124 submits a print job to the print server 102, the print server 102 searches a list of ready media objects in the media catalog 104 for values that match with values in the print job. Therefore, without any mapping, the scheduler 110 may not consider scheduling/sending a print job to printer 130 if the job requests "Regular Yellow" media, because the "Regular Yellow" media request in the print job does not match the "Bright Yellow" ready media object associated with printer 130 in the media catalog 104.

However, either printer 130 or printer 132 may have been suitable for printing the client's print job in this instance. Thus, for more efficient scheduling and printing of print jobs, the print operator may configure and submit a mapping (e.g., element 302) to the print server 102 for printer 130. In this example, the mapping 302 includes an alternate description that indicates "Regular Yellow." The alternate description may be typed in by the print operator or selected from a drop down list. The mapping 302 may also indicate a media description associated with printer 130, which in this case is "Bright Yellow." The media description may be automatically populated with the selection of printer 130 as a ready media object associated with printer 130.

With the mapping 302 enabled, when a client 120-124 sends a print job to the print server 102 requesting "Regular Yellow" the scheduler 110 searches active mappings on the print server 102 and determines mapping 302 is relevant for that print job since it includes an alternate description that matches with the description of requested media in the print job. Additionally, the scheduler 110 determines that mapping 302 applies to printer 130. The scheduler 110 may use the media description associated with printer 130 for scheduling considerations. For example, the "Bright Yellow" ready media object might indicate an amount of media available in printer 130 which the scheduler 110 may use as a scheduling consideration even though the print job is not requesting "Bright Yellow" media.

With mapping 302 stored on the print server 102, the scheduler 110 has a wider range of scheduling options when a client requests "Regular Yellow" media. Since printer 132 has reported containing "Regular Yellow" media, the scheduler 110 may also determine that printer 132 is eligible for the print job based on a direct media match. Scheduler 110 may use a variety of factors to determine whether to schedule the print job with printer 130 or printer 132, which may include the size of the print job, the amount of available media in the printers, other print jobs scheduled with the printers, etc. In one embodiment, if the scheduler 110 determines that scheduling considerations favor printer 130 over printer 132, it modifies the print job to replace the media property specified in the print job with the alternate description (e.g., "Bright Yellow") and sends the modified print job to printer 130 so that it may print without error or manual intervention.

In a further example, suppose that a client 120-124 of the print shop submits print jobs that request a media named "Letter." However, none of the ready media objects in the media catalog 104 of the print server 102 contain a media name of "Letter." Instead, the printers 130-134 available to that client report a media name of "8.5×11." In recognition that 8.5×11 paper is interchangeable with "Letter" media, print operator implements a mapping shown in element 304. Thus, for subsequent print jobs that request "Letter" media, all of the printers (e.g., 130-134) that report having "8.5×11" media may receive and process print jobs that request "Letter" media without cancelling or suspending those print jobs.

Suppose in yet a further example that the print shop has run out of a media described as "Blue 50 gsm" but anticipates a client sending print jobs for such to be printed by a certain deadline. If the print shop has a similar media that is suitable to the client, the operator may implement a mapping similar to that shown in element 306 which includes an alternate description of requested media of "Blue 50 gsm." In this example, printer 134 includes and/or reports including a description of loaded media in at least one of its trays called "Blue 40 gsm." With mapping 306 in place, the print server 102 is able to complete the print job on a substantially similar media (e.g., Blue 40 gsm) to the satisfaction of the client without the delay inherent in physically restocking "Blue 50 gsm" media in the printers 130-134.

A mapping may apply to all printers in an installation, a single printer, or somewhere therebetween. Also, more than one mapping may apply to a subset of printers. In one embodiment, alternate descriptions are based on an acceptable range or generalization relative to the media description for a printer.

To illustrate, a mapping may associate a media density description of "50 gsm" with an acceptable range of +/−10 gsm to allow print jobs that specify a media density between 40 gsm and 60 gsm to correspond with one or more applicable printers as defined by the mapping. In another example, a mapping may generalize media descriptions and/or media properties in print jobs so that the scheduler 110 may correspond a print job with a media description for a printer based on a common base word. Those of ordinary skill in the art will recognize that additional applications and alternative configurations other than that shown and described in FIG. 3 are possible.

Figure 4:
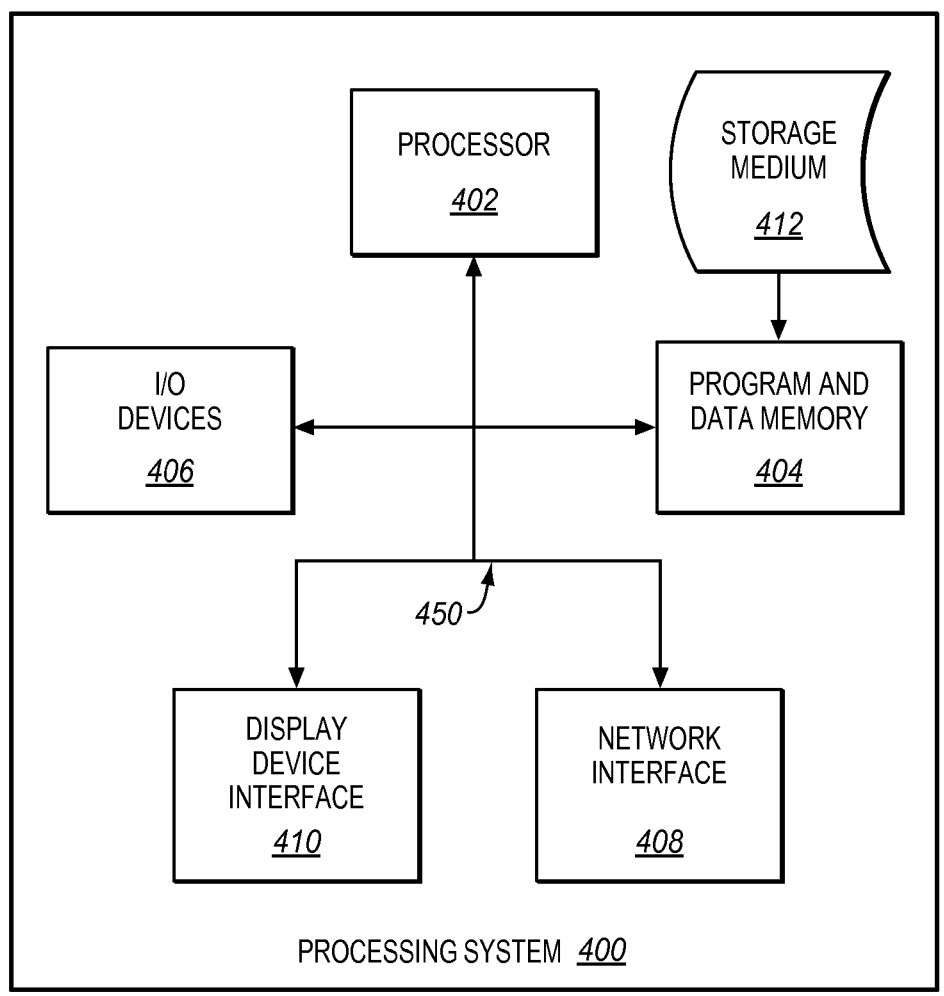
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of the print server 102 to perform the various operations disclosed herein. FIG. 4 illustrates a processing system 400 configured to execute a computer readable medium embodying programmed instructions to perform desired functions in an exemplary embodiment. Processing system 400 is configured to perform the above operations by executing programmed instructions tangibly embodied on computer readable storage medium 412. In this regard, embodiments of the invention can take the form of a computer program accessible via computer-readable medium 412 providing program code for use by a computer or any other instruction execution system. For the purposes of this description, computer readable storage medium 412 can be anything that can contain or store the program for use by the computer.

Computer readable storage medium 412 can be an electronic, magnetic, optical, electromagnetic, infrared, or semiconductor device. Examples of computer readable storage medium 412 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 400, being suitable for storing and/or executing the program code, includes at least one processor 402 coupled to program and data memory 404 through a system bus 450. Program and data memory 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc.) can be coupled either directly or through intervening I/O controllers. Network adapter interfaces 408 may also be integrated with the system to enable processing system 400 to become coupled to other data processing systems or storage devices through intervening private or public networks. Modems, cable modems, SCSI, Fibre Channel, and Ethernet cards are just a few of the currently available types of network or host interface adapters. Presentation device interface 410 may be integrated with the system to interface to one or more presentation devices, such as printing systems and displays for presentation of presentation data generated by processor 402.

Although specific embodiments were described herein, the scope of the invention is not limited to those specific embodiments. The scope of the invention is defined by the following claims and any equivalents thereof.

We claim:

1. An apparatus configured to interface between a client system and a plurality of printers, the apparatus comprising:
a print server configured to receive a description of media in a printer, and to store a mapping that associates the description of media with at least one alternate description for the printer that is comparable to the description of media;
the print server configured to receive a print job that specifies a media property that does not match the description of media in the printer, to determine that the media property corresponds with the at least one alternate description for the printer based on the mapping, and to determine that the printer is eligible for scheduling the print job based on the determination that the media property corresponds with the at least one alternate description.

2. The apparatus of claim 1 wherein:
the print server is configured, in response to reception of the print job, to search a list of alternate descriptions in the mapping for a match between the media property and the at least one alternate description.

3. The apparatus of claim 1 wherein:
the print server is configured to modify the print job by replacing the media property in the print job with the at least one alternate description that corresponds with the media property based on the mapping, and to send the modified print job to the printer.

4. The apparatus of claim 1 wherein:
the print server is configured to receive the description of media from the printer via Simple Network Management Protocol (SNMP).

5. The apparatus of claim 1 wherein:
the print server is configured to receive the description of media from the printer via a device capability (DevCap) file.

6. The apparatus of claim 1 wherein:
the print server is configured to receive the mapping via a graphical user interface of the print server.

7. A method comprising:
receiving a description of media in a printer;
storing a mapping that associates the description of media with at least one alternate description for the printer that is comparable to the description of media;
receiving a print job that specifies a media property that does not match the description of media in the printer;
determining that the media property corresponds with the at least one alternate description for the printer based on the mapping; and
determining that the printer is eligible for scheduling the print job based on the determination that the media property corresponds with the at least one alternate description.

8. The method of claim 7 comprising:
in response to receiving the print job, searching a list of alternate descriptions in the mapping for a match between the media property and the at least one alternate description.

9. The method of claim 7 comprising:
modifying the print job by replacing the media property in the print job with the at least one alternate description that corresponds with the media property based on the mapping, and sending the modified print job to the printer.

10. The method of claim 7 comprising:
receiving the description of media from the printer via Simple Network Management Protocol (SNMP).

11. The method of claim 7 comprising:
receiving the description of media from the printer via a device capability (DevCap) file.

12. The method of claim 7 wherein:
receiving the mapping via a graphical user interface of a print server.

13. A non-transitory computer readable medium embodying programmed instructions which, when executed by a processor, are operable to perform a method comprising:
receiving a description of media in a printer;
storing a mapping that associates the description of media with at least one alternate description for the printer that is comparable to the description of media;
receiving a print job that specifies a media property that does not match the description of media in the printer;
determining that the media property corresponds with the at least one alternate description for the printer based on the mapping; and
determining that the printer is eligible for scheduling the print job based on the determination that the media property corresponds with the at least one alternate description.

14. The medium of claim 13 the method comprising:
in response to receiving the print job, searching a list of alternate descriptions in the mapping for a match between the media property and the at least one alternate description.

15. The medium of claim 13 the method comprising:
modifying the print job by replacing the media property in the print job with the at least one alternate description that corresponds with the media property based on the mapping, and sending the modified print job to the printer.

16. The medium of claim 13 the method comprising:
receiving the description of media from the printer via Simple Network Management Protocol (SNMP).

17. The medium of claim 13 the method comprising:
receiving the description of media from the printer via a device capability (DevCap) file.

18. The medium of claim 13 the method comprising:
receiving the mapping via a graphical user interface of a print server.

* * * * *